United States Patent [19]

Tanaka et al.

[11] 4,186,307
[45] Jan. 29, 1980

[54] RADIATION MEASURING APPARATUS EMPLOYING VARIABLE RATE PULSE SAMPLING CONTROL

[75] Inventors: Eiichi Tanaka, Mitaka; Norimasa Nohara; Takehiro Tomitani, both of Chiba; Makoto Kakegawa, Kawasaki; Nobuo Kumano, Ebina, all of Japan

[73] Assignee: Tokyo Shibaura Electric Co., Ltd., Kawasaki, Japan

[21] Appl. No.: 828,811

[22] Filed: Aug. 29, 1977

[51] Int. Cl.² .............................................. G01T 1/20
[52] U.S. Cl. .................................. 250/363 S; 250/369
[58] Field of Search ............ 250/361 R, 363 R, 363 S, 250/369; 307/237; 364/414

[56] References Cited
U.S. PATENT DOCUMENTS 4,051,373  9/1977  Hatch ................................... 250/369

Primary Examiner—Davis L. Willis
Attorney, Agent, or Firm—Finnegan, Henderson, Farabow & Garrett

[57] ABSTRACT

A scintillation type radiation-measuring apparatus comprising a radiation-detecting scintillator, wherein a scintillation given off from the scintillator is converted into current by a photomultiplier tube; a current amplifier generates a plurality of pulses each proportional to the intensity of said converted current; the pulses have the width clipped by a clipped pulse generating circuit; the clipped form of the pulses is delayed by a delay circuit and integrated by an integrator; the wave height value of the outputs from the integrator is sampled by a sampling circuit to provide a sampled output; and means are provided to supply instructions to start and reset the operation of the integrator and to commence the operation of the sampling circuit in accordance with the interval between successively detected current pulses.

14 Claims, 9 Drawing Figures

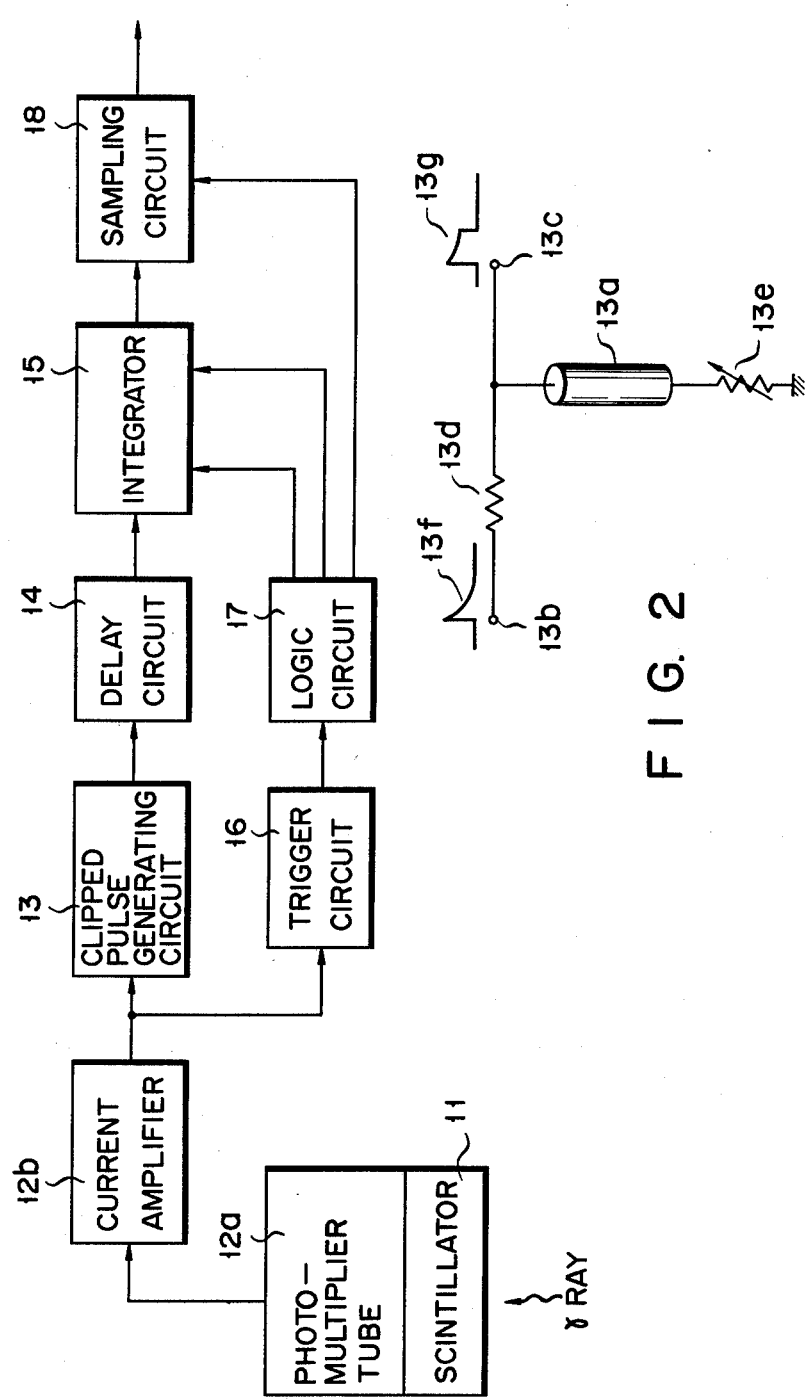

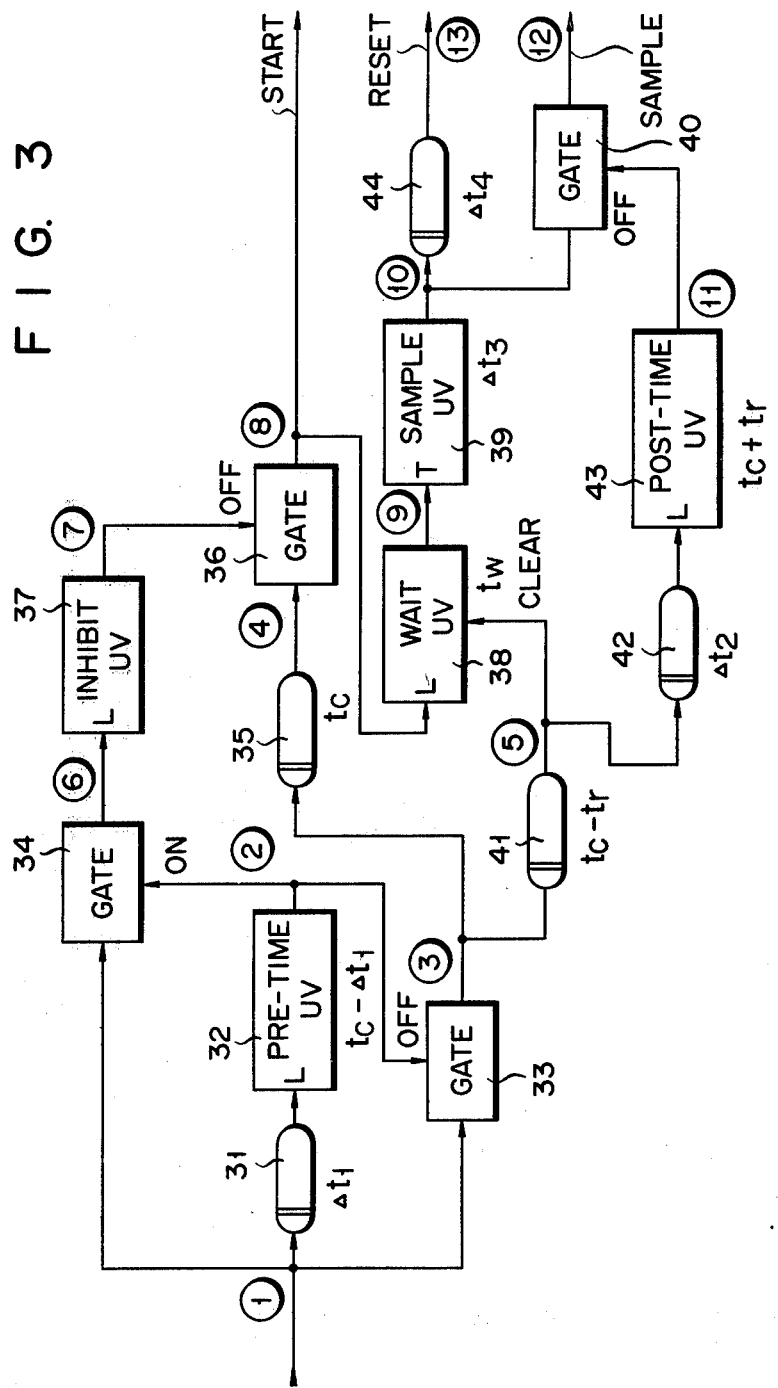

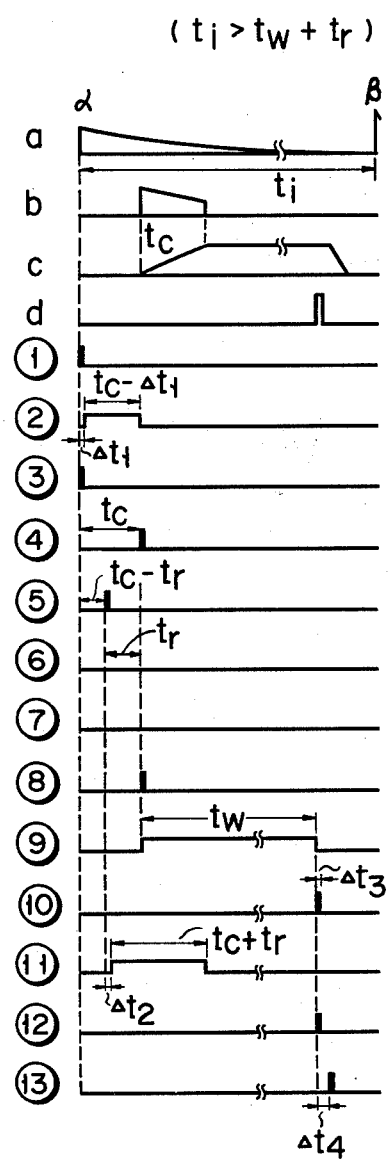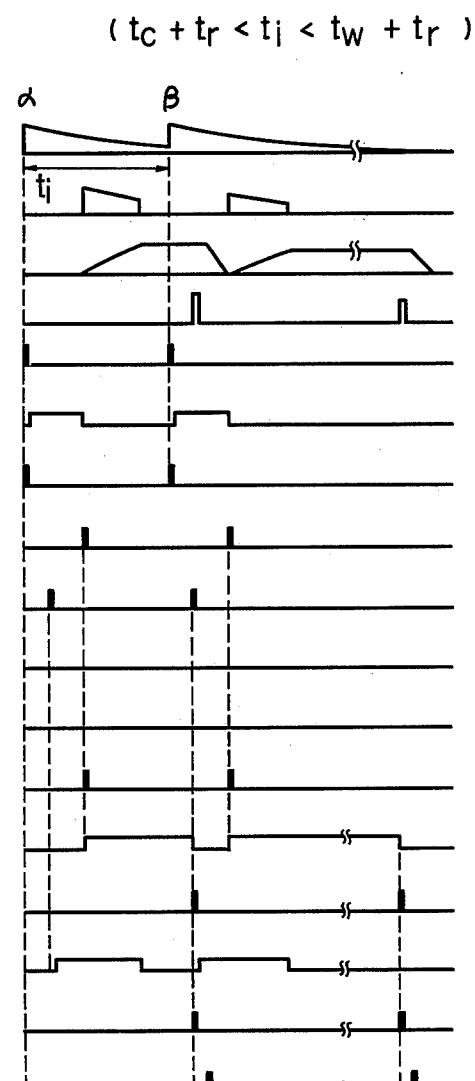
FIG. 4A ($t_j > t_w + t_r$)
FIG. 4B ($t_c + t_r < t_j < t_w + t_r$)

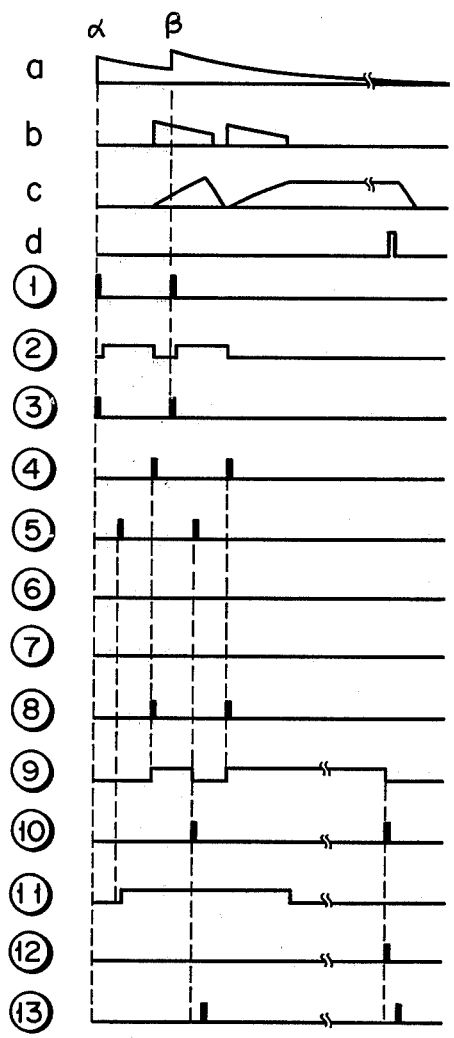
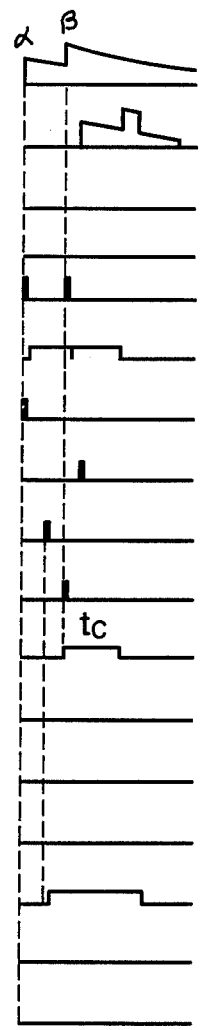
FIG. 4C ($t_c < t_i < t_c + t_r$)
FIG. 4D ($t_i < t_c$)

RADIATION MEASURING APPARATUS EMPLOYING VARIABLE RATE PULSE SAMPLING CONTROL

BACKGROUND OF THE INVENTION

This invention relates to a radiation-measuring apparatus capable of analyzing the energy of radiations such as α-, β-, γ- and X-rays, determining radiation intensity and detecting the position of a radiation source.

With the prior art radiation-measuring apparatus designed to detect radiation by means of a scintillator, γ-rays, for example, interacting with the scintillator are converted into scintillations; and the produced scintillations are converted into current by a photomultiplier tube (hereinafter referred to as "PMT"), and then into current pulses by a current amplifier. The current pulses are integrated by an integrator. The waveform of the integrated current pulses is clipped by a clipped pulse generating circuit, producing a current pulse of short width. The clipped pulse is supplied to a processing circuit comprising, for example, a pulse-height analyzer, thereby determining the energy and intensity of detected radiations. In this case, the pulse-height of an integrated pulse which has been clipped to a short width by the clipped pulse generating circuit is not proportional to the total amount of a scintillation sent forth from the scintillator, but to that portion of the scintillation which has been given off during the clipping period $t_c$. With conventional radiation-measuring apparatus, an attempt to reduce the clipping period $t_c$ in order to shorten a period of analyzing radiation energies would lead to increased statistical fluctuation in the pulse-height. This statistical fluctuation in the pulse-height becomes one of the factors of determining the energy resolving power of a detection system. Therefore, the shortening of the clipping period conversely decreases said energy resolving power, though improving the time resolution of the detector system.

There will now be described the above-mentioned relationship by a mathematical formula. With T taken to denote the decay time constant of the scintillation, and N the total number of photoelectrons collected at the first dynode of the PMT, then the statistical average number ΔN of photoelectrons gathered during a period extending from the point of time t immediately after the incidence of the radiation into the scintillation detector to the point of time $(t+\Delta t)$ may be expressed by the following formula (1):

$$\Delta N = (N/T) e^{-t/T} \cdot \Delta t \quad (1)$$

Therefore, the statistical average number $N_m$ of photoelectrons collected during the clipping period $t_c$ may be expressed by the following formula (2):

$$N_m = N(1 - e^{-t_c/T}) \quad (2)$$

Since the actually observed number of photoelectrons statistically fluctuates in accordance with Poisson's distribution, the relative standard deviation R in a number of photoelectrons may be expressed by the following formula (3):

$$R = \frac{1}{\sqrt{N(1 - e^{-t_c/T})}} \quad (3)$$

The relative standard deviation R expressed by the equation (3) acts as a guide in indicating the energy resolving power. This relative standard deviation R may be expressed as $R = 1/\sqrt{N}$ when the clipping period $t_c$ is long, and becomes equal to that which arises when the total light quanta are collected. Where, however, the clipping period $t_c$ is shortened, then the relative standard deviation R increases accordingly, resulting in a larger statistical error in a measured value and consequently a decline in the energy resolving power of a radiation-measuring apparatus.

With a scintillation detector in actual use, for example, the NaI (T1) scintillator, the decay time constant T of the scintillation indicates 0.25 microseconds. With $(t_c/T)$ chosen to have a value of 3 to 4, then the clipping period $t_c$ is about 0.75 to 1.0 microsecond, and the clipped pulse has a width of about 1 to 1.5 microseconds. This pulse width is too broad to shorten the resolving time and unadapted for use at a high count rate.

As mentioned above, the conventional radiation-measuring apparatus has the drawbacks that where the clipping period $t_c$ is made long to elevate the energy resolving power, then the time resolution is subject to a certain limitation and the apparatus cannot operate effectively at high count rates. Conversely, where the clipping period $t_c$ is shortened to decrease the resolving time, then the energy resolving power drops, thus bringing about contradictory results. Therefore, a present need exists for a radiation-measuring apparatus having both improved energy resolving power and improved resolving time.

SUMMARY OF THE INVENTION

This invention has been accomplished to meet the above-mentioned need, and is intended to provide a radiation-measuring apparatus usable at a high count rate which can shorten the resolving time with a decline in the energy resolving power kept at a minimum level.

For the above-mentioned object, this invention provides a radiation-measuring apparatus which comprises a scintillation detector for detecting radiation; means for receiving current outputs corresponding to scintillations issued from the scintillation detector and generating a plurality of pulses proportional to the current outputs; means for clipping the width of the pulses; means for delaying clipped pulses; means for integrating the clipped pulses; and means for automatically sampling the waveform of the integrated current pulse by the successively detected current pulse.

With the radiation-measuring apparatus of this invention constructed as described above, output pulses from the scintillation detector have the width clipped to a relatively short time width $t_c$ and later delayed and integrated. The integrated waveform of the pulses is sampled by the sampling circuit. The point of time at which said sampling is carried out is automatically controlled according to the point of time at which the succeeding radiation current pulse arrives, thereby attaining the above-mentioned object.

Now, a period $t_s$ extending from the point of time at which a current pulse clipped to a width $t_c$ begins to be integrated by the integrator, after being delayed, to the point of time at which said integrated pulse is sampled is taken to be longer than said pulse width $t_c$. There will now be described the relationship between the above-mentioned period $t_s$ and the statistical precision of a sampled pulse.

Where current converted from a scintillation by the PMT enters the integrator in the form of current pulse through the current amplifier, then the input pulse current I may be expressed by the following formula (4):

$$I=(NG/T)e^{-t/T} \qquad (4)$$

where:
N=total number of photoelectrons reaching the first dynode of the PMT
G=overall amplification factor of the PMT and current amplifier
T=decay time constant of the scintillation given off from a scintillator When integrated by the integrator, the input pulse current I expressed by the above formula (4) is converted into a voltage V indicated by the following formula (5):

$$V=NG(1-e^{-t_c/T}) \qquad (5)$$

The above formula denotes an average value observed after the clipping period $t_c$. Photoelectrons reaching the first dynode of the PMT one after another are limited in number, and observed output current is subject to certain statistical fluctuation. Therefore, the aforesaid formulas (4) and (5) only represent average values. The statistical fluctuation also affects the integrated and sampled output. Where the sampling period $t_s$ is taken to be longer than the clipping period $t_c$, the factor F by which a statistical error associated with sampled output increases (this factor F is hereinafter referred to as "a coefficient of increase in statistical error") may be expressed by the following formula (6):

$$F=[1+e^{-t_s/T}(1-e^{-t_c/T})^{-1}]^{\frac{1}{2}} \qquad (6)$$

The value of F expressed by the above formula (6) denotes the rate at which a statistical error increases from the level of 1 which is taken to represent said statistical error expressed as $1/\sqrt{N}$ when the entire light quanta are collected.

In case of $t_s >> T$ in the above formula (6), then there results $F \simeq 1$. Under this condition, no increase arises in statistical errors. Where, however, the sampling period $t_s$ is shortened, then the factor F increases, resulting in a larger statistical error, as seen from the above formula (6). Where, with the radiation-measuring apparatus of this invention, one radiation current pulse arrives, but the succeeding radiation current pulse is not received during a certain waiting period (which is taken to be, for example, several times as long as the scintillation decay time constant T), then sampling is conducted at the end of said waiting period. Where, however, the succeeding pulse arrives before the end of said waiting period, then the integrated waveform of the preceding pulse is sampled by the succeeding pulse to produce a sampled output. The integrator is immediately reset, allowing the integration of the second pulse to be commenced.

Referring to the sampled output of the preceding pulse, the shorter sampling period $t_s$ gives rise to the enlargement of a coefficient of increase in statistical error in accordance with the formula (6). Since, however, radiation current pulses are received at random in respect of time interval, the probability is quite small that two pulses arrive in close succession, generally minimizing a decline in the overall energy resolving power.

As previously mentioned, supply of instructions to commence and reset the operation of the integrator and an instruction to start the operation of the sampling circuit is automatically controlled according to the intervals between a given pulse and the adjacent ones. Therefore, it is possible to provide a radiation-measuring apparatus usable at a high count rate which is improved in count rate characteristic and can shorten the resolving time without considerably decreasing the energy resolving power.

The radiation-measuring apparatus of this invention is effectively applicable to a device for detecting the position of a radiation source, for example, a scintillation camera.

BRIEF DESCRIPTION OF THE DRAWING

FIG. 1 is a block circuit diagram of a radiation-measuring apparatus embodying the present invention;

FIG. 2 shows the specific arrangement of the clipped pulse-generating circuit—of FIG. 1;

FIG. 3 illustrates the specific arrangement of the logic circuit 17 of FIG. 1;

FIGS. 4A to 4D are timing diagrams showing the manner in which pulses introduced at different intervals are processed;

DETAILED DESCRIPTION OF THE PREFERRED EMBODIMENTS

Figure 5:
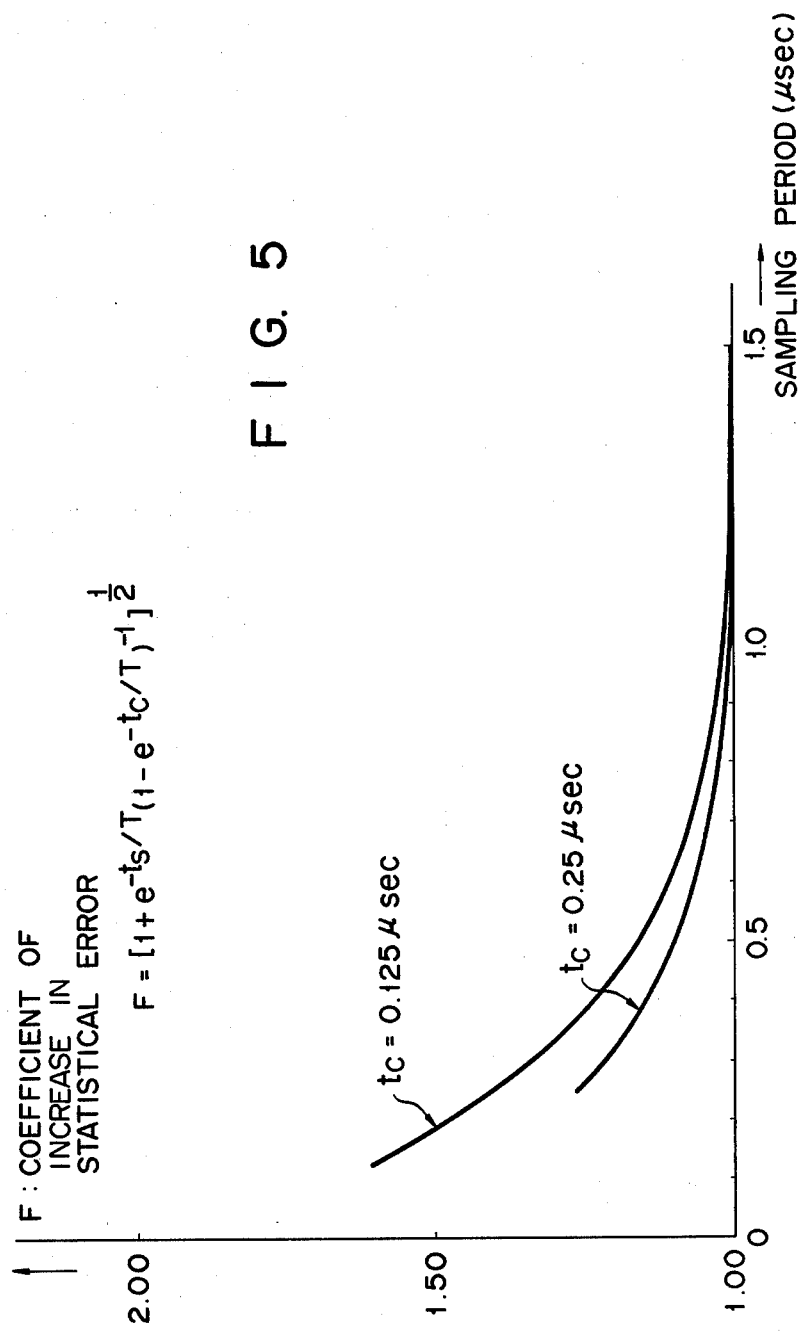
FIG. 5 graphically presents the relationship between sampling period duration and the coefficient of increase in statistical error for two clipping period values.

There will now be described by reference to the appended drawings a radiation-measuring apparatus embodying this invention.

Referring to FIG. 1, radiation, for example, a γ-ray photon entering a scintillator 11 is converted into a scintillation. This scintillation is converted into current by PMT 12a and delivered therefrom in a properly amplified state. Output current from the PMT 12a is converted by a current amplifier 12b into a current pulse proportional to the original scintillation. The current pulse is fed to a clipped pulse-generating circuit 13, which clips the current pulse to a narrow width. This circuit 13 may be formed of that type which comprises a delay line, LCR high pass filter or operational amplifier.

FIG. 2 illustrates the embodiment in which the clipped pulse-generating circuit 13 comprises a delay line 13a. One end of the delay line 13a is connected between the input terminal 13b and output terminal 13c. A resistor 13d having an impedance equal to the characteristic impedance of the delay line 13a is provided between the input terminal 13b and the connection of delay line 13a. The other end of the delay line 13a is grounded through a terminal resistor 13e so that the reflection coefficient assumes a proper value, i.e., -exp$(-t_c/T)$, where $t_c$ denotes a clipping period, and T represents the decay time constant of the scintillation. The input pulse 13f which is supplied to the input terminal 13b attenuates exponentially and functionally overlaps a reflected pulse delayed to an extent of $(t_c/2) \times 2$ by the delay line 13a. As a result, an output pulse is produced at terminal 13c whose width is clipped to $t_c$ as represented by waveform 13g. The clipped pulse 13g, which includes significant scintillation data, is further delayed for a length of time $t_c$ by a delay circuit 14 (FIG. 1) and is then integrated by an integrator 15. The wave height value of the integrated clipped pulse 13g is sampled by a sampling circuit 18. The current pulse delivered from the current amplifier 12b is also presented to a trigger circuit 16 which in turn detects the rise of the current pulse and issues a trigger pulse. The trigger pulse is fed to a logic circuit 17, which generates instruction signals controlling the operation of the integrator 15 and the sampling circuit 18 according to the interval at which current pulses are successively delivered from the current amplifier 12b.

FIG. 3 indicates the specific arrangement of the logic circuit 17. There will now be described by reference to the timing diagrams of FIGS. 4A to 4D the outputs from the respective circuits which vary with the interval of the current pulses.

In the diagram of FIG. 4A, the interval $t_i$ between the current pulse $\alpha$ having a waveform shown at (a) and the succeeding current pulse $\beta$ is larger than the sum $(t_w + t_r)$ of a waiting period $t_w$ (generally chosen to be 3 to 4 times the length of the decay time constant T of the scintillation) during which the current pulse $\alpha$ is clipped to a width $t_c$, delayed for a length of time $t_c$ to have a waveform (b), integrated to have a waveform (c) and finally sampled by pulse (d), and a sufficient length of time $t_r$ during which the sampling of the preceding pulse, the resetting of the integrator and the initiation of the succeeding integration are brought to an end. Where the input terminal of the trigger circuit 16 of FIG. 1 is supplied with the current pulse $\alpha$, then the corresponding trigger pulse indicated in FIG. 4A ① is issued. This trigger pulse ① is delayed for a length of time $\Delta t_1$ by a delay circuit 31 (FIG. 3). The delayed trigger pulse is delivered to a PRE-TIME univibrator 32 (hereinafter abbreviated as "UV"). (The UV may be implemented for example, by a monostable multivibrator.) An output pulse (FIG. 4A ②) from UV 32 switches a gate 33 to an OFF condition and a gate 34 to an ON condition. The circuit block comprising the delay circuit 31, PRE-TIME UV 32 and gate 33 causes the gate 33 to produce an output pulse (FIG. 4A ③) for a given trigger pulse only when the time interval between the given pulse and the preceding pulse, namely, the pre-pulse time interval, is larger than the clipped pulse width $t_c$. In FIG. 4, positive pulse waveforms are illustrated to explain the function of the circuits. However, the polarity of the actual pulse waveforms is not essential.

An output pulse (FIGS. 4A ③) from the gate 33 is delayed for a time interval $t_c$ by a delay circuit 35 and presented to gate 36. Since the trigger pulse (FIG. 4A ①) has a smaller width than the delay time $\Delta t_1$ of the delay circuit 31 (see FIGS. 4A ① and ②), the gate 34 does not produce an output (FIG. 4A ⑥), nor does INHIBIT UV 37 generate an output (FIG. 4A ⑦). Accordingly, the gate 36 remains open to pass the pulse ④ which constitutes an instruction signal (FIG. 4A ⑧) which operates to start the operation of the integrator 15. The leading edge of this instruction ⑧ triggers a WAIT UV 38, providing a rectangular waveform (FIG. 4A ⑨) having a pulse duration $t_w$. The trailing edge of the rectangular pulse ⑨ triggers a SAMPLE UV 39, generating a pulse (FIG. 4A ⑩) having a time width $\Delta t_3$ which is chosen to be sufficiently short to effect the quick operation of the sampling circuit 18. The pulse ⑩ is applied to a gate 40. At this time, output pulse ③ passed by gate 33 is delayed for a length of time $t_c - t_r$ by a delay circuit 41 to form a pulse (FIG. 4A ⑤). This delayed pulse ⑤ is further delayed for a length of time $\Delta t_2$ by a delay circuit 42 and applied to a POST-TIME UV 43 which responds to the leading edge of ⑤ to produce a rectangular waveform (FIG. 4A ⑪) having a pulse width $t_c + t_r$. The rectangular pulse ⑪ ends at a time about $2t_c$ after the point of time at which the trigger pulse ① is supplied. Further, output ⑨ from the WAIT UV 38 has a larger width $t_w$ than the clipping period $t_c$. When, therefore, the SAMPLE UV 39 produces output pulse ⑩, the gate 40 is open, and passes the output pulse ⑩ which constitutes an instruction signal (FIG. 4A ⑫) which operates to initiate operation of the sampling circuit 18. As the result, the sampling circuit 18 generates a sampled output (FIG. 4A (d)) corresponding to the energy of the received radiation.

Upon completion of the above-mentioned sampling, the output pulse ⑩, which is delayed for a length of time $\Delta t_4$ by a delay circuit 44, to issues as instruction signal (FIG. 14A ⑬) which resets the integrator 18.

There will now be described by reference to FIG. 3 and FIG. 4B the timing diagram in which an inteval $t_i$ between the current pulse $\alpha$ issued from the current amplifier 12b and the succeeding current pulse $\beta$ has the relationship of $t_c + t_r < t_i < t_w + t_r$. As in the embodiment of FIG. 4A, the current pulses $\alpha$, $\beta$ are clipped by the clipped pulse-generating circuit 13 and integrated by the integrator 15.

Where, with the embodiment of FIG. 4B, the current pulse $\alpha$ is supplied, and the WAIT UV 38 is put into operation as previously described, then an output pulse (FIG. 4B ⑤), which is delayed for a length of time $t_c - t_r$ by the delay circuit 41 from the point of time at which the succeeding current pulse, $\beta$ produces a trigger pulse clears the WAIT UV 38. The trailing edge of the rectangular output pulse (FIG. 4B ⑨) from WAIT UV 38 causes the SAMPLE UV 39 to generate an output pulse ⑩ having a width $\Delta t_3$. This output pulse ⑩ is delivered as a sampling instruction ⑫ through the gate 40. As the result, the sampling circuit 18 is put into operation to provide a sampled output (FIG. 4B (d)). Upon subsequent issue of integration reset signal ⑬, the sampling of the current pulse $\alpha$ is brought to an end. The timing diagram for the current pulse $\beta$ is similar to that shown in FIG. 4A, unless the further succeeding current pulse is received during an interval $t_w + t_r$ after the incidence of the current pulse $\beta$.

There will now be described by reference to FIGS. 3 and 4C the timing diagram in which an interval $t_i$ between the current pulses $\alpha$ and $\beta$ has the relationship of $t_c < t_i < t_c + t_r$.

Referring to FIG. 3, after the current pulse $\alpha$ triggers the WAIT UV 38, an output pulse ⑩ is produced by the SAMPLE UV 39 and is fed to gate 40. Before a length of time required for the operation of the sampling circuit 18 is brought to an end, a clear instruction based on the current pulse $\beta$ is delivered from the delay circuit 41 to the WAIT UV 38. Accordingly, the trailing edge of output pulse (FIG. 4C ⑨) from the WAIT UV 38 causes the SAMPLE UV 39 to generate an output pulse (FIG. 4C ⑩), which in turn is carried to the gate 40. At this time, a POST-TIME UV 43, which was triggered by the current pulse $\alpha$, is in operation, and the gate 40 is in the OFF condition, a sampling instruction ⑫ is not issued. The current pulse $\beta$ is therefore integrated into a waveform shown in FIG. 4C (c).

There will now be described by reference to FIGS. 3 and 4D the timing diagram representing the case in which an interval $t_i$ between the current pulses α and β is smaller than the clipping period $t_c$. In this case, the clipped forms of the current pulses α, β overlap each other (FIG. 4D (b)), and are prevented from being integrated (FIG. 4D (c)). A trigger pulse ① resulting from the arrival of the current pulse α is issued as an output pulse ③ from the gate 33. The delay circuit 35 delays output pulse ③ for a length of time $t_c$ and produces an output pulse ④.

Trigger pulse ① resulting from the arrival of the current pulse β is generated while the PRE-TIME UV 32 triggered by the trigger pulse based on the current pulse α is still in operation. Therefore, an output from said PRE-TIME UV 32 actuates the gate 34 into the ON condition, which in turn produces an output pulse ⑥. This output pulse ⑥ triggers the INHIBIT UV 37 with the resultant issue of a rectangular pulse ⑦. This rectangular pulse ⑦ is supplied to inhibit the gate 36, forcing it to the OFF condition. When the gate 36 is left in OFF condition, output pulse ④ from the delay circuit 35 is prevented from being issued as an integration-starting instruction (FIG. 4D ⑧). Since, at this time, the interval between the current pulses α, β is smaller than $t_c$, the trigger pulse resulting from the current pulse α causes the PRE-TIME UV 32 to generate the rectangular pulse ②, inhibiting the gate 33 and in consequence preventing the succeeding current pulse β from passing through the gate 33. As a result, neither of the current pulses α, β is sampled.

As previously described, the arrangement of the logic circuit 17 shown in FIG. 3 automatically controls the supply of instructions to commence and reset the operation of the integrator 15 and an instruction to start the operation of the sampling circuit 18 according to an interval between the adjacent ones of a plurality of pulses corresponding to various forms of radiation which are detected by the scintillator. Where, in the detection of various forms of radiation received at random, the count rate runs high, and an interval between the adjacent pulses is shorter than the sum $(t_w+t_r)$, where $t_w$ represents the waiting period for sampling and $t_r$ represents a sufficient length of time to issue an instruction for starting integration by the succeeding pulse, then the preceding pulse is automatically supplied with a sampling instruction by the succeeding pulse, thereby shortening a sampling period $t_s$.

A shortened sampling period $t_s$ generally means an increase, as shown in FIG. 5, in the coefficient F of increase in statistical error expressed by the formula $F=[1+e^{-t_s/T}(1-e^{-t_c/T})^{-1}]^{\frac{1}{2}}$. In the case of a low count rate, however, it is very rare that the interval between adjacent ones of successively received pulses is shorter than the length of time $t_w+t_r$. Therefore, the decline in the overall energy resolving power may be considered negligible. Where the count rate runs higher, intervals between the respective pulses become progressively shorter than the aforesaid period $t_w+t_r$, leading to an unavoidable gradual decline in the overall energy resolving power.

From the standpoint of shortening the time resolution, it will well serve the purpose of measuring pulses corresponding to various radiations, if the interval between a given pulse and the preceding pulse (prepulse interval) is longer than at least the period required to form a clipped pulse, and the interval between said given pulse and the succeeding pulse (postpulse interval) is longer than the sum $(t_c+t_r)$ of the clipping period $t_c$ and the time $t_r$ to issue an instruction for commencing integration by the succeeding pulse. With n(cps) taken to denote count rate represented by incoming pulses, the count rate actually observed ($n_o$ may be expressed by the following formula (7):

$$n_o = ne^{-(2t_c+t_r)\cdot n} \qquad (7)$$

The term $2t_c+t_r$ given in the above formula (7) denotes a substantial resolving time. With $t_c$ taken to be 0.125 microseconds and $t_r$ to be 0.1 microseconds, for example, the substantial resolving time is 0.35 microseconds. With the prior art process of measuring radiation, a particular circuit is provided to prevent adjacent current pulses from overlapping each other, thereby choosing an interval between adjacent current pulses to be longer than a prescribed pulse width τ. Count rate $n_o'$ actually observed by the prior art process is expressed by the following formula (8):

$$n_o' = ne^{-2\tau n} \qquad (8)$$

The term 2τ given in the above formula (8) indicates a substantial resolving time. With τ taken to be 1 microsecond, the resolving time is 2 microseconds. The resolving time of this invention is thus limited only by the clipping period $t_c$ and the aforesaid period $t_r$ and is far more shortened than that of the prior art process, significantly improving the count rate characteristic of a radiation-measuring apparatus.

With the prior art radiation-measuring process, the signal produced after sampling of a given pulse is usually supplied to a signal-processing device for the succeeding analysis, such as pulse-height analysis, arithmetic operation and display. If the signal-processing device consumes a relatively long period of analysis, then an extra analyzing period will be added to the original analyzing period. One attempt to minimize the decline in the high count rate characteristic of a radiation-measuring apparatus has been to provide a buffer memory, for example, a derandomizer, to temporarily store each succeeding pulse according to an interval between the adjacent ones of successively received current pulses. However, provision of an additional buffer memory complicates the arrangement of a radiation-measuring apparatus.

As seen from FIG. 4A (c) showing the integration of a current pulse by reference of which an embodiment of this invention was described, the integrated form the current pulse acts as a sort of analog buffer memory which maintains a state which will permit analysis during a period of waiting for sampling, unless the succeeding current pulse is received. For example, where, with the radiation-measuring apparatus of this invention, two current pulses arrive in close succession, the integrated preceding pulse is sampled upon arrival of the succeeding current pulse and begins to be analyzed. During said analysis, the succeeding current pulse itself remains integrated, unless a further succeeding current pulse is received. After completion of the analysis of the preceding current pulse, the first succeeding current pulse is sampled for analysis. To this end, however, the period required for analysis should be shorter than the length of time $t_w+t_r$.

A radiation-measuring apparatus embodying this invention can sustain a higher count rate characteristic than the prior art radiation-measuring apparatus due to the unique manner in which the operation of the integrator is controlled.

The embodiment of FIG. 1 comprises a combination of the integrator 15 controlled by a starting instruction and a reset instruction and the sampling circuit 18 put into operation by a sampling instruction. However, this invention is not limited to this arrangement, but may be applicable in various modifications. For example, substitution of a gated integrator for the integrator 15 enables both the commencement and termination of integration to be controlled by one gate signal. It is also possible to apply a gated integrator concurrently acting as a sampling unit which carries out sampling when integration is stopped. For control of sampling, it is possible to provide a particular circuit which can assure completion of sampling prior to the issuance of an integration reset instruction. Further, termination of sampling may be effected by stopping the sampled signal by means of a linear gate, or by providing the aforesaid gated integrator concurrently acting as a sampling unit with the function of stopping only sampling, thereby supplying a sampling-inhibiting pulse prior to the issuance of an integration reset instruction.

The radiation-measuring apparatus of this invention is applicable not only to measuring the distribution of signal pulse-height for analysis of radiation energies, but also may be used with a device such as a scintiscanner which measures the intensity of radiation falling within a prescribed range of radiation energy. Further, the radiation-measuring apparatus of the invention can be used with a device for giving data on radiation by providing one or more scintillation detectors and carrying out a prescribed arithmetic operation from the pulse-height of signals produced by the scintillation detectors. The radiation-measuring apparatus of the invention is effectively applicable to a scintillation camera designed to detect the distribution of radioisotopes in a human body.

With, for example, an Anger-type scintillation camera as described in the U.S. Pat. No. 3,011,057, a large number of PMT's may be provided for a disk-like NaI (T1) scintillator. Outputs from the PMT's are supplied to a position-calculating matrix, that is, outputs from the PMT's are added together after being multiplied by prescribed weighting factors, providing outputs proportional to the position coordinates of the light-emitting spots on the scintillator. These outputs are used as position signals. Four position-calculating matrix units are provided so as to extend along the rectangularly intersecting coordinates, that is, in the directions of the axes of $X^+$, $X^-$, $Y^+$, $Y^-$. Further, there is provided a radiation energy matrix to obtain a Z signal, that is, an energy signal proportional to the total light quanta. After the pulse-height of an output Z signal from an energy matrix is analyzed, the signals corresponding to energies which fall within a prescribed range are selected. With the above-mentioned type of scintillation camera, operations of $X=(X^+-X^-)/Z$, and $Y=(Y^+-Y^-)/Z$ are conducted in the analog form from five signals delivered from the above-mentioned four position-calculating matrices and the energy matrix. The resultant final position signals are supplied to, for example, a cathode ray tube (CRT) to produce a bright spot. These bright spots are photographed to provide a radioisotope image. The position signals may also be recorded in an electronic computer.

In this case, the statistical fluctuation of the amplitude of a pulse directly affects the resolving power of a scintillation camera, and the pulse width affects the time resolution. Attempts to decrease the pulse width in order to shorten the resolving time have led to an increase in the statistical fluctuation of a signal with a resultant decline in the resolving power of the scintillation camera. Therefore, prior art scintillation cameras have not exhibited a good count rate characteristic. However, application of the radiation-measuring apparatus of this invention can provide a scintillation camera having an improved count rate characteristic.

Figure 6:
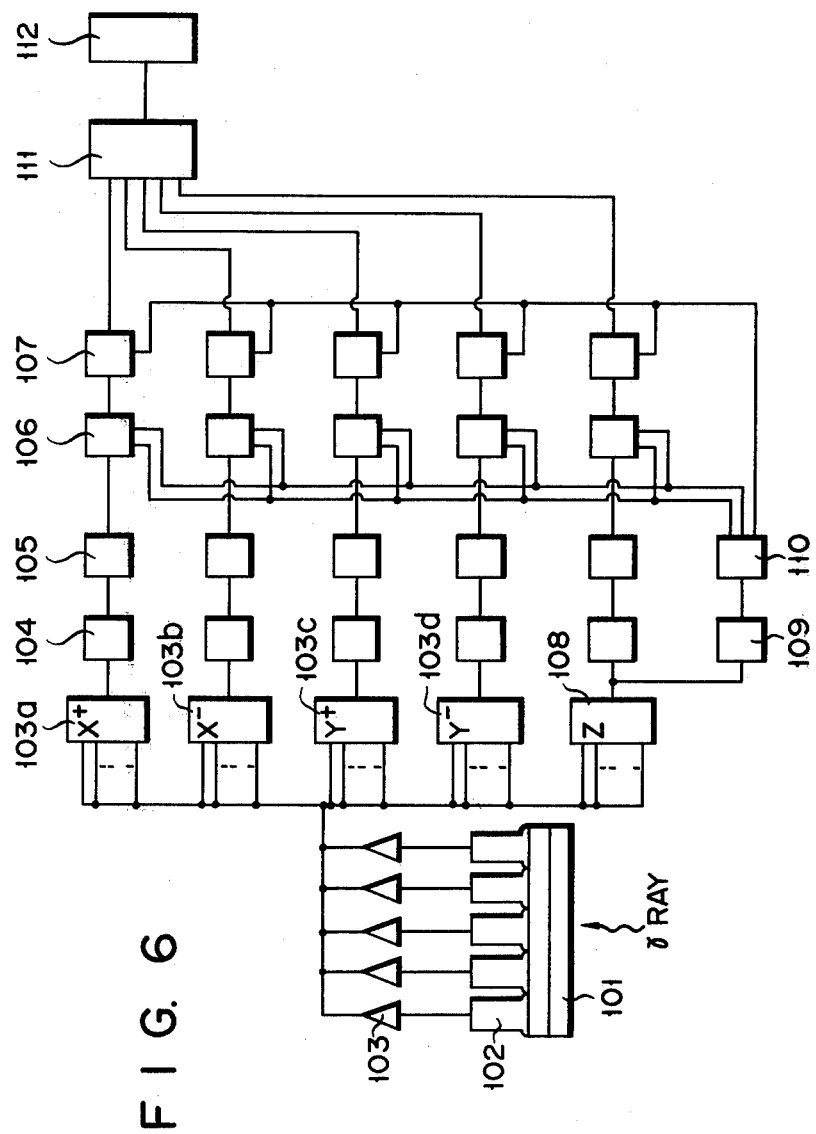
FIG. 6 is a block circuit diagram showing the application of the radiation-measuring apparatus of the invention to a scintillation camera.

There will now be described by reference to the block diagram of FIG. 6 an embodiment in which the radiation-measuring apparatus of this invention is employed in a scintillation camera. Scintillations resulting from γ-rays entering a disk-like scintillator 101 formed of, for example, NaI (T1) are converted into amplified current signals by a plurality of PMT's 102 mounted on the scintillator 101. The amplified current outputs are again amplified by the succeeding amplifiers 103. Pulses proportional to the current outputs from the PMT's are supplied to position-calculating matrices 103a, 103b, 103c, 103d extending along the axes $X^+$, $X^-$, $Y^+$, $Y^-$ respectively. Output pulses from the position-calculating matrices 103a to 103d are processed by the pulse-clipping circuit 104, delay circuit 105, integrator 106, and sampling circuit 107. The energy matrix 108 is also supplied with pulses proportional to current outputs from the PMT's, producing a Z signal corresponding to the total light quanta. An output pulse from the energy matrix 108 is fed to a triggering circuit 109 and logic circuit 110 in turn. Outputs from the logic circuit 110 control the operation of the integrators 106 and sampling circuits 107 associated with the four circuits 103a–103d. Outputs from the sampling circuits 107 are arithmetically processed by the arithmetic operation circuit 111 as in the case of an ordinary scintillation camera, to be converted into final position signals and supplied to an output device 112 such as a CRT display means or an electronic computer.

The radiation-measuring apparatus of this invention is also applicable to another scintillation camera which comprises a different calculation system, for example, a delay line type position-calculating circuit, in which outputs from the PMTs are added together for each row and column of the PMTs array. In this case, it is advised to subject pulses to the prescribed processing used in the invention and supply the processed pulses to the intermediate taps of a delay line designed for calculation of the position of a light-emitting spot on the scintillator.

A radiation detection system using two scintillation detectors includes a fast-slow coincidence method. In this case, two radiation pulses having a prescribed time relationship with each other are detected by two scintillation detectors. The points of time at which output pulses from the scintillation detectors arrive are detected by a fast triggering circuit. The pulses whose arrival times have thus been detected are delivered to a fast coincidence circuit to judge a pattern of coincidence. The respective signal pulses are also analyzed to select those pulses which have a pulse-height falling within the prescribed range. Slow coincidence detection is made between pulses having the selected pulse-height and the fast coincidence output pulse, thereby effecting rapid coincidence detection along with the analysis of radiation energies. In this case, too, the period required for analyzing pulse-height raises problems at high count rates, thus indicating that the radiation-measuring apparatus of this invention is useful in this environment as well.

The radiation-measuring apparatus of the invention is further applicable to a device for determining the attenuation of radiation passing through an object such as, for example, a human body. Where the intensity of X-rays, for example, penetrating the human body is measured by a scintillation detector, it is not generally feasible to measure the intensity of penetrating X-rays by counting the individual current pulses corresponding to X-ray photons. In most cases, the intensity of X-rays is measured in the form of average current from the PMT. If the intensity of X-rays could be measured by individual pulse counting and the pulse-height of the pulses analyzed, then it would be possible to increase the precision of measurement by selecting X-ray energies being measured and eliminating the effect of scattered X-rays. Since, in the above-mentioned case, the scintillation detector often receives a high intensity of X-rays, the application of the radiation-measuring apparatus of this invention is effective to carry out the measurement of radiation with high statistical precision in a short length of time.

What we claim is:

1. A scintillation type of radiation-measuring apparatus comprising:
    means for producing radiation-induced scintillations;
    means for detecting and converting said scintillations into electrical signals;
    means for clipping said electrical signals during a clipping period $t_c$ to produce pulses which are substantially representative of said scintillations;
    means for delaying said pulses by a predetermined time period;
    means for integrating the pulses produced at the output of said delaying means;
    means for sampling the waveform produced by said integrating means; and
    logic circuit means for generating instruction signals for controlling the operation of said integrating and sampling means according to the interval between adjacent ones of said electrical signals, thereby improving the radiation analyzing capacity of said radiation-measuring apparatus.

2. The radiation-measuring apparatus according to claim 1, wherein said logic circuit means includes means for generating instruction signals operable to cause sampling of the integrated waveform of the preceding one of the pulses representing said adjacent signals in response to the detection of the succeeding one of said signals and to reset said integrating means immediately following said sampling operation.

3. The radiation-measuring apparatus according to claim 1, wherein said logic circuit means includes means for generating instruction signals operable to cause sampling of said integrated waveform of the preceding one of the pulses representing said adjacent signals after a predetermined period of time terminating prior to the time that said succeeding signal is produced and to reset said integrating means immediately following said sampling operation.

4. The radiation-measuring apparatus according to claim 1, wherein said logic circuit means includes means for generating instruction signals for inhibiting the sampling of the integrated waveform of the preceding one of the pulses representing said adjacent signals where the interval between said adjacent signals is shorter than the sum of said clipping period and the period required to complete said sampling operation and reset said integrating means, said logic circuit means further including means for resetting said integrating means and for causing said integrating means to commence the integration of the next succeeding output pulse.

5. The radiation-measuring apparatus according to claim 1, wherein said logic circuit means includes means for generating signals for inhibiting the sampling of the integrated waveforms of the pulses produced in response to both said adjacent electrical signals where the interval between said electrical signals is shorter than said clipping period.

6. The radiation-measuring apparatus according to claim 1 wherein said delay means delays said pulses by a period of time equal to at least said clipping period $t_c$ and wherein said logic circuit means comprises:
    means for detecting the interval between adjacent ones of said electrical signals;
    first means for producing a first instruction signal to cause said integrating means to integrate the preceding one of the pulses representing said adjacent signals when $ti > tc$, where $ti$ designates said interval; and
    second means for producing a second instruction signal to cause said sampling means to sample the integrated waveform of said preceding one of said pulses when $ti > tc + tr$, where $tr$ is the period of time required for completing said sampling operation and resetting said integrating means.

7. The radiation-measuring apparatus according to claim 6, wherein said first and second means are further operable to produce said first and second instruction signals when $ti > tw + tr$, where $tw$ is greater than $tc$ and designates a period of time which is chosen to be several times as long as the delay time constant of said scintillations.

8. The radiation-measuring apparatus according to claim 7, wherein said first and second means are further operable to produce said first and second instruction signals when $ti$ has a value lying between $tc + tr$ and $tw + tr$.

9. The radiation-measuring apparatus according to claim 6, wherein said logic circuit means further comprises means for inhibiting said first and second instruction signals when $ti < tc$.

10. A scintillation camera apparatus comprising:
    scintillation means for producing radiation-induced scintillations representing radiation energy emitted from a predetermined area under examination;
    photomultiplier means for detecting and converting said scintillations into electrical current pulses;
    means for processing said current pulses to provide position and quantum signals representing, respectively, the portion of said area in which said scintillations are detected and the intensity of said scintillations;
    means for clipping said position and quantum signals during a clipping period $t_c$ to produce pulses which are substantially representative of said scintillations;
    means for delaying said clipped pulses by a period of time at least equal to $tc$;
    means for integrating the pulses produced at the output of said delaying means;
    means for sampling the waveforms produced by said integrating means;
    logic circuit means for generating instruction signals for controlling the operation of said integrating means and said sampling means, said logic circuit means including:

means for detecting the interval between adjacent ones of said current pulses;

first means for producing a first instruction signal to cause said integrating means to integrate the pulses representing the position and quantum signals produced in response to the preceding one of said adjacent current pulses when $t_i > t_c$, where $t_i$ represents the interval between said adjacent pulses; and second means for producing a second instruction signal to cause said sampling means to sample said integrated pulses when $t_i > t_c + t_r$, where $t_r$ is the period of time required for completing said sampling operation and resetting said integrating means;

arithmetic operation means for converting said sampled pulses into coordinate signals representing the position of origin within said area of said scintillations; and means for displaying said coordinate signals.

11. The scintillation camera apparatus according to claim 10, wherein said processing means includes position signal calculating matrices representing X and Y coordinate axes located in said area and means for generating quantum signals representing the total light quantum of said scintillations.

12. The scintillation camera apparatus according to claim 11, wherein said logic circuit means operates in response to said quantum signal.

13. Radiation measuring apparatus comprising, in combination:

means for detecting the incidence of radiation within a predetermined area and for producing electrical pulses representing the quantity of radiation detected;

means for clipping said pulses during a clipping period $t_c$ to produce clipped pulses substantially representative of said electrical pulses;

means for delaying said clipped pulses by a predetermined time period;

means for integrating the pulses passed by said delaying means;

means for sampling the output of said integrating means to produce output signals representing radiation measurements; and logic circuit means for generating instruction signals for operating said integrating and sampling means, said logic circuit means producing a first instruction signal to actuate said integrating means to integrate a first one of said delayed pulses in the event that the pulse next succeeding said first pulse is detected after a period of more than $t_c$ following the detection of said first pulse, said logic circuit means further producing a second instruction signal to actuate said sampling means to sample said integrating means and produce an output signal after a predetermined interval $t_w$ following commencement of said integration.

14. The radiation measuring apparatus set forth in claim 13 wherein said logic circuit means further comprises:

means for advancing the generation of said second instruction signal in the event that the pulse next succeeding said first pulse follows said first pulse by an interval which is less than the sum of $t_w + t_r$, where $t_r$ is the period of time required for completing said sampling operation and resetting said integrating means, whereby an increase in the rate of incidence of said radiation does not materially affect the time resolution of said apparatus.

* * * * *

UNITED STATES PATENT AND TRADEMARK OFFICE
CERTIFICATE OF CORRECTION

PATENT NO. : 4,186,307
DATED : JANUARY 29, 1980
INVENTOR(S) : Eiichi TANAKA ET AL It is certified that error appears in the above-identified patent and that said Letters Patent are hereby corrected as shown below:

TITLE PAGE:

After "Assignee", "The Director Of The National Institute Of Radiological Sciences, Science And Technology Agency" should be listed in addition to Tokyo Shibaura Electric Co., Ltd.

Signed and Sealed this

Seventh Day of April 1981

[SEAL]

Attest:

RENE D. TEGTMEYER

Attesting Officer     Acting Commissioner of Patents and Trademarks